United States Patent
Chang

(10) Patent No.: US 12,393,512 B2
(45) Date of Patent: Aug. 19, 2025

(54) DATA STORAGE DEVICE AND NON-VOLATILE MEMORY CONTROL METHOD

(71) Applicant: Silicon Motion, Inc., Jhubei (TW)

(72) Inventor: Yi-Kang Chang, New Taipei (TW)

(73) Assignee: SILICON MOTION, INC., Jhubei (TW)

( * ) Notice: Subject to any disclaimer, the term of this patent is extended or adjusted under 35 U.S.C. 154(b) by 4 days.

(21) Appl. No.: 18/407,809

(22) Filed: Jan. 9, 2024

(65) Prior Publication Data

US 2024/0289269 A1   Aug. 29, 2024

Related U.S. Application Data

(60) Provisional application No. 63/486,668, filed on Feb. 24, 2023.

(30) Foreign Application Priority Data

Jul. 4, 2023  (TW) .................................. 112124836

(51) Int. Cl.
   G06F 12/02   (2006.01)
(52) U.S. Cl.
   CPC .. G06F 12/0246 (2013.01); *G06F 2212/7211* (2013.01)
(58) Field of Classification Search
   None
   See application file for complete search history.

(56) References Cited

U.S. PATENT DOCUMENTS

| | | | | |
|---|---|---|---|---|
| 8,612,804 B1* | 12/2013 | Kang | ................... | G06F 12/0238 714/42 |
| 8,898,373 B1* | 11/2014 | Kang | ................... | G06F 12/0246 711/E12.008 |
| 9,710,176 B1* | 7/2017 | Tang | ................... | G06F 12/0246 |
| 2010/0077135 A1* | 3/2010 | Li | ....................... | G06F 12/0246 711/E12.001 |
| 2019/0332320 A1* | 10/2019 | Wu | ....................... | G06F 3/0616 |
| 2020/0110544 A1* | 4/2020 | Zhu | ....................... | G06F 3/0616 |
| 2023/0004306 A1* | 1/2023 | Onishi | ................... | G06F 3/0647 |
| 2024/0152452 A1* | 5/2024 | Shin | ..................... | G06F 12/0238 |

* cited by examiner

*Primary Examiner* — Stephanie Wu
(74) *Attorney, Agent, or Firm* — McClure, Qualey & Rodack, LLP

(57) ABSTRACT

A non-volatile memory life-extension technology is shown. Based on two values related to the write amplification factor of non-volatile memory, the controller coupled to the non-volatile memory adjusts the execution frequency of the wear-leveling migration performed on the non-volatile memory. By executing the wear-leveling migration, the controller uses the first block, which is a spare block, to store the data of the second block, whose erase count is lower than that of the first block, and then erases and releases the second block for reuse. The frequency adaptation of the execution of wear-leveling migration effectively avoids the exacerbation of write amplification problems.

14 Claims, 3 Drawing Sheets

DATA STORAGE DEVICE AND NON-VOLATILE MEMORY CONTROL METHOD

CROSS REFERENCE TO RELATED APPLICATIONS

This application claims the benefit of U.S. Provisional Application No. 63/486,668, filed Feb. 24, 2023 the entirety of which is incorporated by reference herein.

This application further claims priority of Taiwan Patent Application No. 112124836, filed on Jul. 4, 2023, the entirety of which is incorporated by reference herein.

BACKGROUND OF THE INVENTION

Field of the Invention

The present invention relates to control technology for a data storage device.

Description of the Related Art

There are various forms of non-volatile memory (NVM) used for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has its own special storage characteristics and requires a corresponding storage architecture. In this technical field, a control technology must be developed based on the particular storage architecture of non-volatile memory.

BRIEF SUMMARY OF THE INVENTION

Based on the special storage characteristics of non-volatile memory, a non-volatile memory life-extension technology is proposed in this disclosure.

A data storage device in accordance with an exemplary embodiment of the disclosure has a non-volatile memory and a controller. The controller is coupled to the non-volatile memory, and is configured to operate the non-volatile memory as requested by a host. Based on a first value and a second value related to a write amplification rate, the controller adjusts the execution frequency of wear-leveling migration performed on the non-volatile memory. The controller performs the wear-leveling migration to allocate the first block, which is a spare block of the non-volatile memory, to store data moved from the second block, which has an erase count lower than that of the first block, and erase and release the second block for reuse.

In an exemplary embodiment, the execution frequency of wear-leveling migration is adjusted based on the ratio of the first value to the second value, to switch between a plurality of levels. In response to the ratio of the first value to the second value increasing to a higher level, the execution frequency of wear-leveling migration is adjusted to a lower level.

In an exemplary embodiment, the first value is C/TotalPE', where the numerator C is the erasure increment due to wear-leveling migration, indicating the erasure burden of the non-volatile memory due to wear-leveling migration, and the denominator TotalPE' is the total number of erasures generated when the non-volatile memory is operated with wear-leveling migration. The second value is $1-X/Xt$, where the numerator X is the write amplification rate evaluated when the non-volatile memory is operated without wear-leveling migration, and the denominator Xt is the upper limit for the write amplification rate. The denominator Xt be configured by the manufacturer or user of the data storage device.

In an exemplary embodiment, the closer the first value approaches the second value, the lower the execution frequency of wear-leveling migration is.

In an exemplary embodiment, a non-volatile memory control method based on the foregoing concepts is proposed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
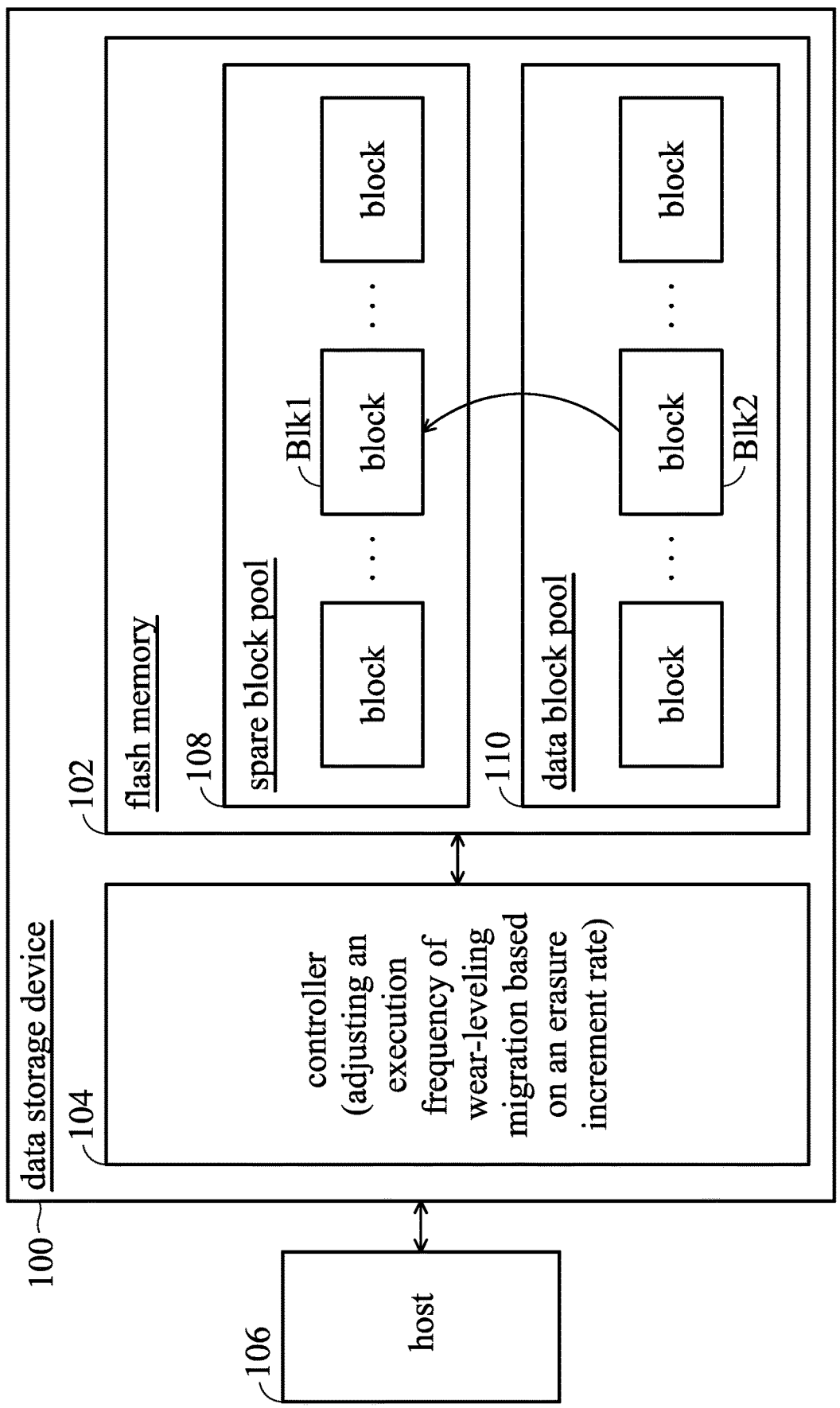
FIG. 1 illustrates a data storage device 100 in accordance with an exemplary embodiment of the present disclosure.

The following description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example, but is not limited thereto. The proposed technology may be applied to the other types of non-volatile memory.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A processor of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics. A host may issue logical addresses (for example, logical block addresses LBAs or global host page numbers GHPs) to read or write the flash memory. Logical addresses need to be mapped to physical addresses of the physical space of the flash memory. The mapping rule depends on the architecture of a flash memory.

The physical space of a flash memory is divided into a plurality of blocks for storage. Each block includes a plurality of pages. Each page includes a plurality of sectors. Specifically, data is updated to spare space rather than overwriting on the old data. After data updating, the old data is regarded as invalid data. A block with plenty of invalid data should be processed by garbage collection, and then the space of the block is released, and erasure is performed on the whole block for reuse of this block. However, the erasure process may shorten flash memory life. Once a certain percentage of blocks have erase counts above the upper limit, the flash memory must prohibit writing. To deal with this problem, a wear-leveling technology is developed.

There are two types of wear leveling: dynamic wear leveling; and static wear leveling. Dynamic wear leveling selects the spare block with the lower erase count to store data to avoid overuse of blocks that have been erased several times. Static wear leveling, also known as wear-leveling migration, treats the data stored in the low-erase-count blocks (cold blocks) as cold data with the lower update probability, and moves the cold data to a spare block with the higher erase count (hot block). After the data moving, the cold blocks can be released and erased for reuse, and the hot blocks are frozen by storing cold data. However, the wear-leveling migration involves block erasure. If the moved data is not actually cold data, the hot blocks will not be achieved, and the redundant erasure will shorten the service life of the product.

In the data writing operation requested by the host, in addition to the erasure due to the data writing itself, there are some other reasons, such as garbage collection, error preservation, wear leveling, etc., may cause block erasure. This disclosure proposes a memory life-extension technology that adjusts the execution frequency of wear-leveling migration based on a first value and a second value related to a write amplification rate. In an exemplary embodiment, the first value is an erasure increment rate, which is the ratio of the number of additional block erasure due to wear-leveling migration to the total number of block erasure. Adjusting the execution frequency of wear-leveling migration based on the erasure increment rate will avoid or reduce the chance of redundant migration due to the mistaken cold data, prevent the deterioration of write amplification, and extend the service life of the product. In other exemplary embodiments, the first value and the second value may have other variants, for example, weighting or other variation parameters may be further considered.

FIG. 1 illustrates a data storage device 100 in accordance with an exemplary embodiment of the present disclosure, which includes a flash memory 102 and a controller 104. The controller 104 is coupled to the flash memory 102, and is configured to control the flash memory 102 as requested by a host 106. The storage space of the flash memory 102 is erased in blocks. The spare blocks waiting to be allocated for data storage belong to a spare block pool 108. The blocks storing data belong to a data block pool 110. The controller 104 provides a wear-leveling migration function, which uses the first block Blk1 (a destination block for wear-leveling migration) in the spare block pool 108 to store valid data moved from the second block Blk2 (a source block for wear-leveling migration) of the data block pool 110 (wherein the erase count of the second block Blk2 is lower than the erase count of the first block Blk1). Then, the second block Blk2 is released and erased for reuse. In this way, the less used second block Blk2 is released to the spare block pool 108 for reuse, and the frequently-used first block Blk1 has a chance to be frozen (because it may store cold data from the second block Blk2 and thereby is protected from further erasure) to avoid rapid wear and tear. However, the content moved from the second block Blk2 is not guaranteed cold data. If the data collected from the second block Blk2 to the first block Blk1 is hot data, the first block Blk1 will be released again soon due to the frequent update of hot data. Such a phenomenon is particularly observed from an erasure increment rate defined in the disclosure. The controller 104 adjusts the execution frequency of wear-leveling migration according to the erasure increment rate. Once the erasure increment rate gets worse, the execution frequency of wear-leveling migration is reduced. On the contrary, in response to the erasure increment rate getting better, the controller 104 may increase the execution frequency of wear-leveling migration. The controller 104 adjusts the execution frequency of wear-leveling migration in response to the change of the erasure increment rate.

In an exemplary embodiment, the execution frequency of the wear-leveling migration can be changed between a plurality of levels, corresponding to the different values of the erasure increment rate. As the erasure increment rate increases to an upper criterion, the controller changes the execution frequency of wear-leveling migration to a lower frequency level. As the erasure increment rate drops to a lower criterion, the controller changes the execution frequency of wear-leveling migration to a higher frequency level.

In an exemplary embodiment, the controller 104 regards a spare block with an erase count greater than the threshold as a candidate block for the first block Blk1 (which is a destination block for wear-leveling migration). The controller 104 calculates a mod value (%) of the erase count of the candidate block. In this design, the different levels of execution frequency of wear-leveling migration correspond to different remainder combinations. For example, the lower the expected execution frequency is, the fewer numbers the target remainder combination contains. It is determined whether the calculated remainder of the candidate block is one number contained in the target remainder combination. If yes, the candidate block is formally regarded as the first block Blk1 (the destination block) for wear-leveling migration. If not, the candidate block fails to trigger the wear-leveling migration.

In an exemplary embodiment, the execution frequency of wear-leveling migration may be adjusted between N levels, where N is an integer. The controller 104 uses a divisor N to take the remainder of the erase count of the candidate block. In response to the execution frequency of wear-leveling migration being at an Nth level of that corresponds to the highest execution frequency, the controller 104 ignores the calculated remainder and directly takes the candidate block as the first block Blk1 (the destination block) for wear-leveling migration. In this way, any spare block with an erase count exceeding the threshold will trigger the wear-leveling migration. Spare blocks with higher erase counts may be frozen by cold data originally stored in low-erase-count blocks. And, after the wear-leveling migration, the low-erase-count blocks with only invalid data remained can be released and erased for reuse. Corresponding to an $(N-1)_{th}$ level of execution frequency of wear-leveling migration that corresponds to the second highest execution frequency, the target remainder combination includes all (N−1) non-zero remainders. That is, if the erase count of the candidate block is exactly a multiple of N (with a zero remainder when the divisor is N), the wear-leveling migration is not triggered; but, if the erase count of the candidate block is not a multiple of N, the wear-leveling migration is triggered. Based on this concept, the lower level the execution frequency is at, the fewer numbers are contained in the target remainder combination, and the less frequently the wear-leveling migration is performed.

In an exemplary embodiment, a test procedure is performed. A series of write data (with a data amount Host_Write_Data) is scheduled and written into the flash memory 102 when the wear-leveling migration is disabled. The total number of block erasures TotalPE that have occurred on the entire flash memory 102 is recorded and, accordingly, a write amplification rate X is evaluated, which is:

$$X = TotalPE * block\_size/Host\_Write\_Data$$

where the size of each block is represented by block_size.

When the controller 104 practically operates with the enabled wear-leveling migration, the total number of block erasures that have occurred in the entire flash memory 102 is TotalPE' and, accordingly, another write amplification rate X' is evaluated, which is:

$$X' = TotalPE' * block\_size/Host\_Write\_Data$$

The write amplification rate X' should not exceed an upper limit Xt set by the product manufacturer or user. In this disclosure, an erasure increment due to wear-leveling migration is C (=TotalPE'−TotalPE), which shows the additional block erasure burden on the flash memory 102 due to the wear-leveling migration. Based on the following derivation, $$\frac{X}{X'} = \frac{TotalPE}{TotalPE'} \approx \frac{TotalPE' - C}{TotalPE'} = 1 - \frac{C}{TotalPE'}$$

it shows, $$\frac{C}{TotalPE'} \approx 1 - \frac{X}{X'}$$

In an exemplary embodiment, C/TotalPE' may be used as the first value (i.e., an erasure increment rate), and can be evaluated by the calculation 1−X/X'. By substituting Xt into X', the second value which is the upper limit of the ratio C/TotalPE' is evaluated. The ratio between the first value C/TotalPE' and the second value 1−X/Xt shows the trend of the erasure increment rate C/TotalPE' (deteriorated or improved). When the first value approaches the second value, it means that the write amplification rate of the product is approaching its upper limit set by the product manufacturer or user. The controller 104 adjusts the execution frequency of wear-leveling migration based on the difference between the first value and the second value.

In an exemplary embodiment, the first value approaching the second value means that the erasure increment rate is getting worse. The controller 104 switches to slow down the execution frequency of wear-leveling migration.

In an exemplary embodiment, the execution frequency of wear-leveling migration is adjusted between a plurality of levels, in response to the degree to which the first value approaches the second value.

In an exemplary embodiment, the controller 104 uses a divisor 4 to take the remainder of the erase count of the candidate block (a spare block whose erase count exceeds the threshold), and adjusts the wear-leveling migration in four levels. The four levels are:

Level 4 (the highest level WL_Level_0x0):
In situations where the first value is less than 80% of the second value, wherein any spare block with an erase count exceeding the threshold is permitted to trigger the wear-leveling migration;

Level 3 (the second highest level WL_Level_0x1):
In situations where the first value is between 80% and 90% of the second value, wherein the candidate block with any non-zero remainder (greater than or equal to 1 after the calculation %4 on the erase count) is permitted to trigger the wear-leveling migration;

Level 2 (WL_Level_0x2):
In situations where the first value exceeds 90% of the second value but is less than or equal to 95% of the second value; wherein the candidate block with a remainder (calculating %4 on the erase count) that is greater than or equal to 2 (i.e., 3 or 2) is permitted to trigger the wear-leveling migration; and Level 1 (WL_Level_0x3):
In situations where the first value exceeds 95% of the second value; wherein the candidate block with a remainder (calculating %4 on the erase count) that is greater than or equal to 3 (i.e., only 3) is permitted to trigger the wear-leveling migration.

This exemplary embodiment clearly shows that at the lower execution frequency level, the target remainder combination includes the fewer numbers, and the lower opportunity to trigger the wear-leveling migration.

In another exemplary embodiment, the controller 104 records an erase count difference (hereinafter marked as PE_difference) between each block and the lowest-erase-count block. In an exemplary embodiment, a spare block with an erase count difference PE_difference exceeding the threshold is regarded as a candidate block for the destination block of wear-leveling migration. The remainder is calculated from the erase count difference PE_difference of the candidate block by a mod function (%). By determining whether the calculated remainder is one number of the target remainder combination corresponding to the expected execution frequency of wear-leveling migration, the candidate block is permitted to trigger the wear-leveling migration or not. In an exemplary embodiment, the execution frequency of wear-leveling migration has the four levels:

Level 4 (the highest level WL_Level_0x0):
In situations where the first value is less than 80% of the second value, wherein any spare block with an erase count difference PE_difference exceeding the threshold is permitted to trigger the wear-leveling migration;

Level 3 (the second highest level WL_Level_0x1):
In situations where the first value is between 80% and 90% of the second value, wherein the candidate block with any non-zero remainder (greater than or equal to 1 after the calculation, %4, on the erase count difference PE_difference) is permitted to trigger the wear-leveling migration;

Level 2 (WL_Level_0x2):
   In situations where the first value exceeds 90% of the second value but is less than or equal to 95% of the second value; wherein the candidate block with a remainder (calculating %4 on the erase count difference PE_difference) that is greater than or equal to 2 (i.e., 3 or 2) is permitted to trigger the wear-leveling migration; and Level 1 (WL_Level_0x3):
   In situations where the first value exceeds 95% of the second value; wherein the candidate block with a remainder (calculating %4 on the erase count difference PE_difference) that is greater than or equal to 3 (i.e., only 3) is permitted to trigger the wear-leveling migration.

In the other exemplary embodiments, it is not limited to make decision based on the erase count or the erase count difference PE_difference. The modulo calculation may be performed on any value derived from the erase count. The modulo calculation may be performed on any evaluation value derived from the erase count.

Figure 2:
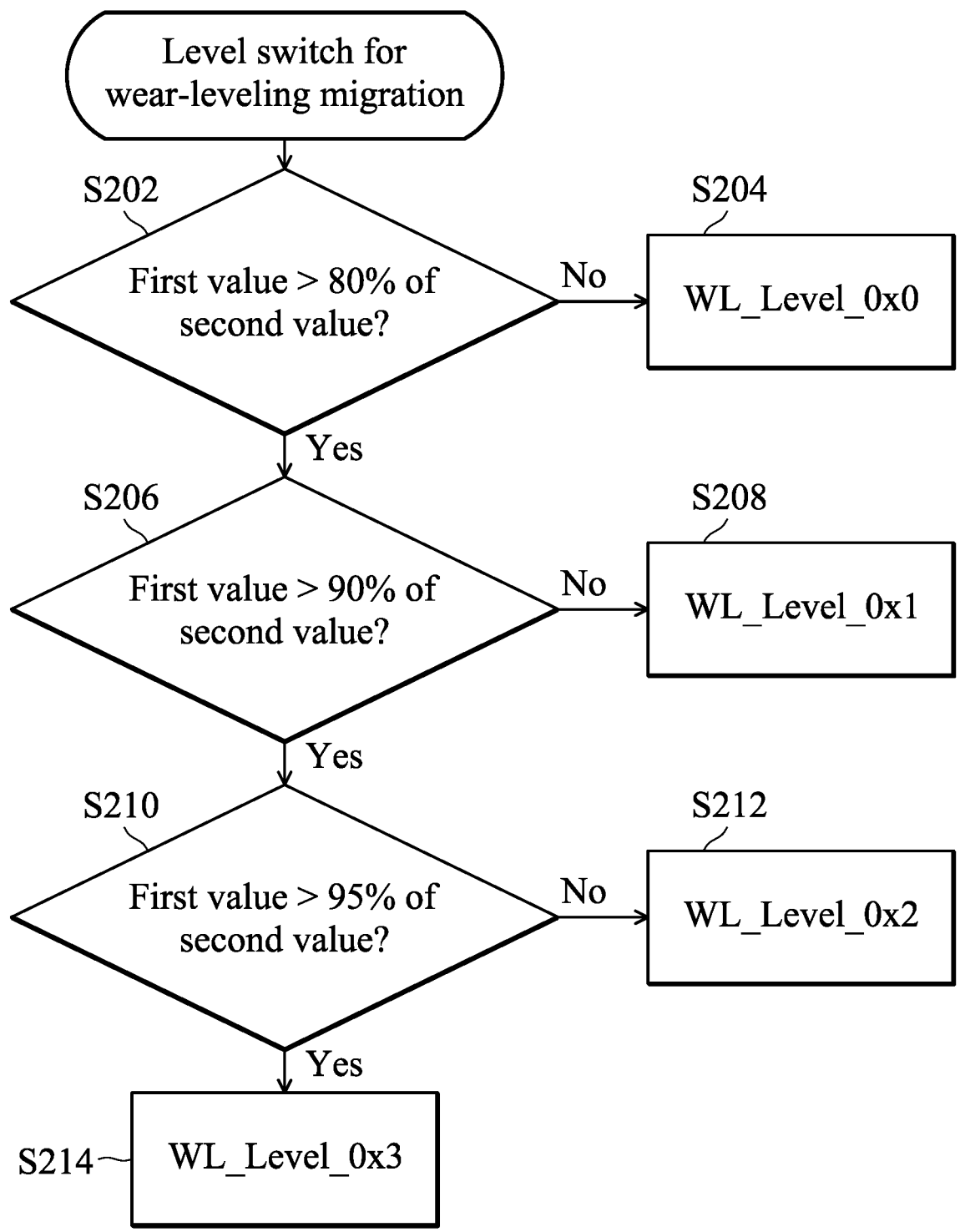
FIG. 2 is a flow chart illustrating how the controller 104 switches the execution frequency of wear-leveling migration.

FIG. 2 is a flow chart illustrating how the controller 104 switches the execution frequency of wear-leveling migration.

In step S202, the controller 104 determines whether the first value is greater than or equal to 80% of the second value. If not, it means that the write amplification rate is still within the acceptable range, and the procedure proceeds to step S204. In step S204, the controller 104 sets the execution frequency of wear-leveling migration to the highest level WL_Level_0x0. On the contrary, the procedure proceeds to step S206. In step S206, the controller 104 determines whether the first value exceeds 90% of the second value. If not, according to step S208, the controller 104 sets the execution frequency of wear-leveling migration to the second highest level WL_Level_0x1. Compared to the full level WL_Level_0x0, the wear-leveling migration is executed less frequently at the second highest level WL_Level_0x1.

If it is determined in step S206 that the first value exceeds 90% of the second value, the controller 104 determines in step S210 whether the first value exceeds 95% of the second value. If not, according to step S212, the controller 104 sets the execution frequency of wear-leveling migration at the third highest level WL_Level_0x2. Compared to the second highest level WL_Level_0x1, the wear-leveling migration is executed less frequently at the third highest level WL_Level_0x2.

If it is determined in step S210 that the first value exceeds 95% of the second value, according to step S214, the controller 104 sets the execution frequency of the wear-leveling migration at the lowest level WL_Level_0x3. Compared to the third highest level WL_Level_0x2, the wear-leveling migration is executed less frequently at the lowest level WL_Level_0x3.

The first value may be the other variants derived from the value C/TotalPE'. The second value may the other variants derived from the value 1−X/Xt.

Figure 3:
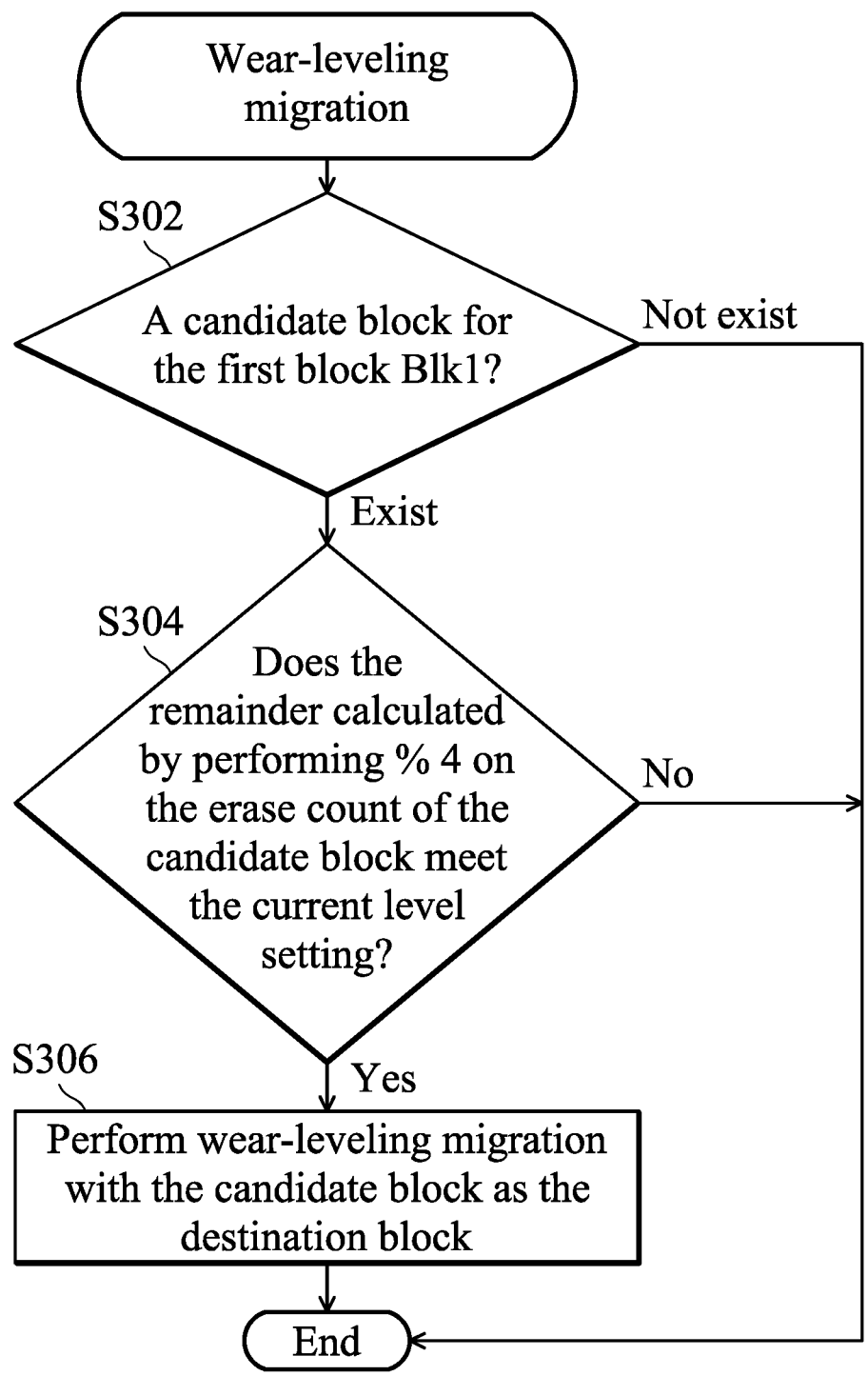
FIG. 3 is a flow chart illustrating how the controller 104 performs wear-leveling migration at the setting level in accordance with an exemplary embodiment of the present disclosure.

FIG. 3 is a flow chart illustrating how the controller 104 performs wear-leveling migration at the setting level in accordance with an exemplary embodiment of the present disclosure.

In step S302, the controller 102 monitors whether there is a candidate block for the first block Blk1 (to be the destination block for wear-leveling migration). For example, a spare block newly released to the spare block pool 108 should be checked to determine whether its erase count us greater than the threshold. If yes, the newly released spare block is regarded as the candidate block for the first block Blk1 (to be the destination block for wear-leveling migration).

If there is a candidate block, according to step S304, the controller 104 determines whether the remainder calculated by performing a modulo calculation on the erase count of the candidate block (calculated by %4) meets the current level setting (being one number contained in the target remainder combination corresponding to the expected execution frequency of wear-leveling migration). If it does not match, the wear-leveling migration of the candidate block is not allowed, and the process ends. On the contrary, according to step S306, the controller 104 uses the candidate block as the destination block for the wear-leveling migration (i.e., to be the first block Blk1). The controller 104 moves valid data from a lower-erase-count data block of the data block pool 110 (i.e., the second block Blk2) to the first block Blk1, and then erases and releases the second block Blk2 for reuse.

In an exemplary embodiment, the controller 104 monitors the lowest erase count in all blocks, and dynamically updates the difference between the erase counts of the other blocks and the lowest erase count. Based on the monitored erase count difference of each block, the controller 104 statistically estimates a practical value TotalPE' of the total erase count of all blocks of the entire flash memory 102. The controller 104 subtracts a test result TotalPE (the test result about the total erase count accumulated when the wear-leveling migration is disabled) from the practical value TotalPE' (the practical total erase count with enabled wear-leveling migration) to obtain the erasure increment C due to wear-leveling migration.

The aforementioned adjustment for execution frequency of wear-leveling migration may be slightly modified according to user needs. Any technology that adjusts the execution frequency of wear-leveling migration based on the erasure increment rate (caused by the enabled wear-leveling migration) is involved in this disclosure.

The aforementioned concept can be further used to implement a non-volatile memory control method, including adjusting the execution frequency of wear-leveling migration based on an erasure increment rate due to the enabled wear-leveling migration. The erasure increment rate shows the proportion of the number of additional data block erasures performed in order to perform wear-leveling migration on the non-volatile memory to the total number of data block erasures happened while the wear-leveling migration is disabled. Through the wear-leveling migration, a spare first block in the non-volatile memory receives data moved from the second block, whose erase count is lower than the first block's, and then erases and releases the second block for reuse.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data storage device, comprising:
   a non-volatile memory; and
   a controller, coupled to the non-volatile memory and configured to operate the non-volatile memory as requested by a host, wherein:
based on a first value and a second value, the controller adjusts an execution frequency of wear-leveling migration performed on the non-volatile memory;
the controller performs the wear-leveling migration to allocate a first block, which is a spare block of the non-volatile memory, to store data moved from a second block that has an erase count lower than that of the first block, and erase and release the second block for reuse;
the first value is C/TotalPE', where a numerator C is an erasure increment due to wear-leveling migration, indicating an erasure burden of the non-volatile memory due to wear-leveling migration, and a denominator TotalPE' is a total number of erasures generated when the non-volatile memory is operated with wear-leveling migration; and
the second value is 1−X/Xt, where a numerator X is a write amplification rate evaluated when the non-volatile memory is operated without wear-leveling migration, and a denominator Xt is an upper limit for the write amplification rate.

2. The data storage device as claimed in claim 1, wherein:
the closer the first value approaches the second value, the lower the execution frequency of wear-leveling migration is.

3. The data storage device as claimed in claim 2, wherein:
the execution frequency of wear-leveling migration is adjusted based on a ratio of the first value to the second value, to switch between a plurality of levels.

4. The data storage device as claimed in claim 3, wherein:
the controller determines a spare block with an erase count greater than a threshold as a candidate block for the first block;
the controller calculates a remainder by performing a modulo calculation on an evaluation value derived from the erase count of the candidate block; and
in response to the candidate block having a calculated remainder being one number of a target remainder combination, the controller regards the candidate block as the first block for wear-leveling migration;
wherein:
the different levels of execution frequency of wear-leveling migration correspond to different remainder combinations; and
the lower the execution frequency is, the fewer numbers are contained in the target remainder combination.

5. The data storage device as claimed in claim 4, wherein:
the execution frequency of wear-leveling migration switches between N levels, where N is an integer;
the controller uses a divisor N to calculate the remainder of the evaluation value derived from the erase count of the candidate block;
in response to the execution frequency of wear-leveling migration being at an Nth level of that corresponds to the highest execution frequency, the controller ignores the calculated remainder and directly takes the candidate block as the first block for wear-leveling migration; and
corresponding to an $(N-1)_{th}$ level of execution frequency of wear-leveling migration that corresponds to the second highest execution frequency, the target remainder combination includes all (N−1) non-zero remainders; and
the lower level the execution frequency is at, the fewer numbers are contained in the target remainder combination.

6. The data storage device as claimed in claim 4, wherein:
the evaluation value is the erase count of the candidate block itself, or an erase count difference between the candidate block and a lowest erase count block.

7. A non-volatile memory control method, comprising:
performing wear-leveling migration on a non-volatile memory; and
adjusting an execution frequency of wear-leveling migration based on a first value and a second value,
wherein:
the wear-leveling migration is performed to allocate a first block, which is a spare block of a non-volatile memory, to store data moved from a second block that has an erase count lower than that of the first block, and erase and release the second block for reuse;
the first value is C/TotalPE', where a numerator C is an erasure increment due to wear-leveling migration, indicating an erasure burden of the non-volatile memory due to wear-leveling migration, and a denominator TotalPE' is a total number of erasures generated when the non-volatile memory is operated with wear-leveling migration; and
the second value is 1−X/Xt, where a numerator X is a write amplification rate evaluated when the non-volatile memory is operated without wear-leveling migration, and a denominator Xt is an upper limit for the write amplification rate.

8. The non-volatile memory control method as claimed in claim 7, wherein:
the closer the first value approaches the second value, the lower the execution frequency of wear-leveling migration is.

9. The non-volatile memory control method as claimed in claim 8, wherein:
the execution frequency of wear-leveling migration is adjusted based on a ratio of the first value to the second value, to switch between a plurality of levels.

10. The non-volatile memory control method as claimed in claim 9, further comprising:
determining a spare block with an erase count greater than a threshold as a candidate block for the first block;
calculating a remainder by performing a modulo calculation on an evaluation value derived from the erase count of the candidate block; and
in response to the candidate block having a calculated remainder being one number of a target remainder combination, taking the candidate block as the first block for wear-leveling migration;
wherein:
the different levels of execution frequency of wear-leveling migration correspond to different remainder combinations;
the lower the execution frequency is, the fewer numbers are contained in the target remainder combination.

11. The non-volatile memory control method as claimed in claim 10, further comprising:
providing N levels to switch the execution frequency of wear-leveling migration, where N is an integer;
using a divisor N to take the remainder of the evaluation value derived from the erase count of the candidate block;
in response to the execution frequency of wear-leveling migration being at an Nth level of that corresponds to the highest execution frequency, ignoring the calculated remainder and directly taking the candidate block as the first block for wear-leveling migration;

corresponding to an $(N-1)_{th}$ level of execution frequency of wear-leveling migration that corresponds to the second highest execution frequency, having the target remainder combination including all (N-1) non-zero remainders; and the lower level the execution frequency is at, the fewer numbers are contained in the target remainder combination.

12. The non-volatile memory control method as claimed in claim 10, wherein:

the evaluation value is the erase count of the candidate block itself, or an erase count difference between the candidate block and a lowest erase count block.

13. A data storage device, comprising:

a non-volatile memory; and a controller, coupled to the non-volatile memory and configured to operate the non-volatile memory as requested by a host, wherein:

based on a first value and a second value, the controller adjusts an execution frequency of wear-leveling migration performed on the non-volatile memory;

the controller performs the wear-leveling migration to allocate a first block, which is a spare block of the non-volatile memory, to store data moved from a second block that has an erase count lower than that of the first block, and erase and release the second block for reuse;

the execution frequency of wear-leveling migration is adjusted based on a ratio of the first value to the second value, to switch between a plurality of levels;

in response to the ratio of the first value to the second value increasing to a higher level, the execution frequency of wear-leveling migration is adjusted to a lower level;

the controller determines a spare block with an erase count greater than a threshold as a candidate block for the first block;

the controller calculates a remainder by performing a modulo calculation on an evaluation value derived from the erase count of the candidate block; and in response to the candidate block having a calculated remainder being one number of a target remainder combination, the controller takes the candidate block as the first block for wear-leveling migration;

the different levels of execution frequency of wear-leveling migration correspond to different remainder combinations; and the lower the execution frequency is, the fewer numbers are contained in the target remainder combination.

14. The data storage device as claimed in claim 13, wherein:

the execution frequency of wear-leveling migration switches between N levels, where N is an integer;

the controller uses a divisor N to take the remainder of the evaluation value derived from the erase count of the candidate block;

in response to the execution frequency of wear-leveling migration being at an Nth level of that corresponds to the highest execution frequency, the controller ignores the calculated remainder and directly takes the candidate block as the first block for wear-leveling migration; and corresponding to an (N−1)th level of execution frequency of wear-leveling migration that corresponds to the second highest execution frequency, the target remainder combination includes all (N−1) non-zero remainders; and the lower level the execution frequency is at, the fewer numbers are contained in the target remainder combination.

* * * * *